United States Patent [19]

Sonoda et al.

[11] 4,315,267

[45] Feb. 9, 1982

[54] METHOD OF MAGNETOFLUIDIC RECORDING

[75] Inventors: Nobuo Sonoda, Settsu; Wataru Shimotsuma, Ibaraki; Yoshio Kishimoto; Yoichi Sekine, both of Hirakata, all of Japan

[73] Assignee: Matsushita Electric Industrial Co., Ltd., Osaka, Japan

[21] Appl. No.: 138,682

[22] Filed: Apr. 9, 1980

Related U.S. Application Data

[63] Continuation of Ser. No. 924,872, Jul. 14, 1978, abandoned.

[30] Foreign Application Priority Data

| Jul. 22, 1977 | [JP] | Japan | 52/88712 |
| Dec. 13, 1977 | [JP] | Japan | 52/150214 |
| Dec. 19, 1977 | [JP] | Japan | 52/153233 |
| Dec. 19, 1977 | [JP] | Japan | 52/153234 |
| Dec. 19, 1977 | [JP] | Japan | 52/153235 |
| Apr. 13, 1978 | [JP] | Japan | 53/43981 |
| Apr. 13, 1978 | [JP] | Japan | 53/43982 |
| Apr. 13, 1978 | [JP] | Japan | 53/43983 |

[51] Int. Cl.³ .............................. G01D 15/16
[52] U.S. Cl. .............................. 346/1.1; 101/DIG. 13; 346/74.2; 346/140 R
[58] Field of Search ............ 346/140 R, 75, 1.1, 346/74.2, 74.5; 101/DIG. 13

[56] References Cited

U.S. PATENT DOCUMENTS

| 2,925,312 | 2/1960 | Hollmann | 346/75 X |
| 3,060,429 | 10/1962 | Winston | 346/75 X |
| 3,341,859 | 9/1967 | Adams | 346/140 R |
| 3,510,878 | 5/1970 | Johnson | 346/1.1 |
| 3,739,396 | 6/1973 | Harada | 346/140 R |
| 3,787,879 | 1/1974 | Ichioka | 346/140 R |
| 3,914,771 | 10/1975 | Lunde | 346/153 |

FOREIGN PATENT DOCUMENTS

| 49-17746 | 4/1974 | Japan . |
| 49-48141 | 6/1974 | Japan . |
| 51-15419 | 3/1976 | Japan . |
| 147225 | 3/1961 | U.S.S.R. . |

OTHER PUBLICATIONS

Pennington et al.; Magnetic Ink Printer With Ink-On-Demand Capability; IBM TDB; vol. 16, No. 10, Mar. 1974, pp. 3414–3415.

Mitchell et al.; Ink-On-Demand Printing and Copying; IBM TDB, vol. 18, No. 2, Jul. 1975, pp. 608–609.

*Primary Examiner*—Joseph W. Hartary
*Attorney, Agent, or Firm*—Stevens, Davis, Miller & Mosher

[57] ABSTRACT

A method and an apparatus for nozzleless magnetofluidic recording are disclosed in which a magnetofluidic material is arranged on the surface of a support member disposed oppositely to a recording surface, and by applying a magnetic force to the magnetofluidic material, the magnetofluidic material is protruded on the support member. Further, the magnetofluidic material is subjected to a coulomb force or a magnetic force and transferred from the protruded part to the recording surface, thereby producing an image on the recording surface.

20 Claims, 44 Drawing Figures

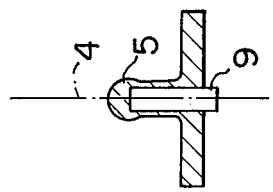
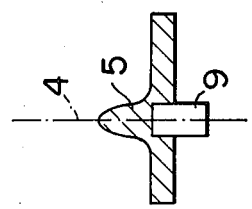
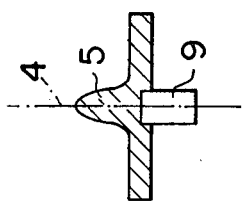
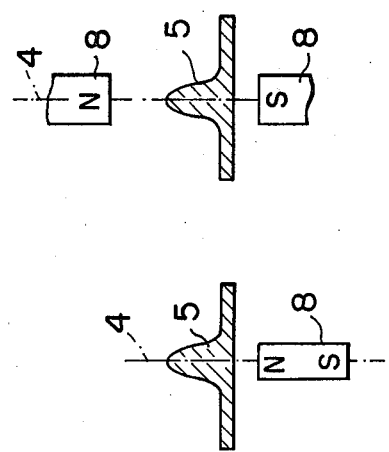
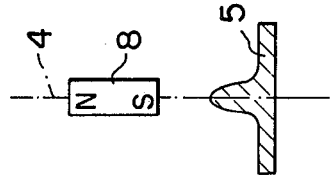

F I G. 13a
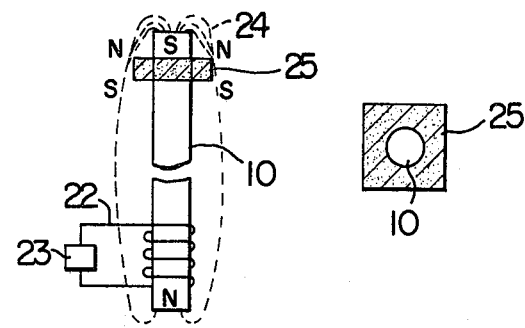
F I G. 13b
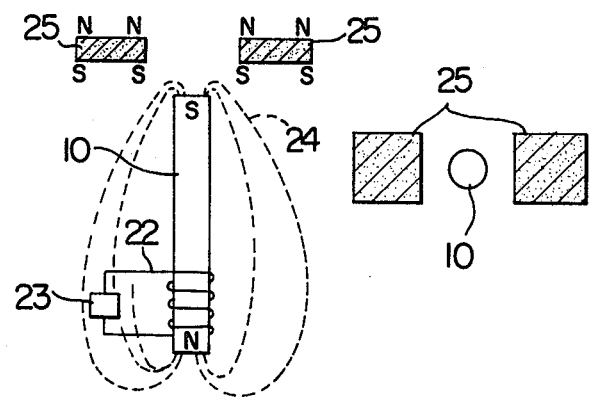
F I G. 13c
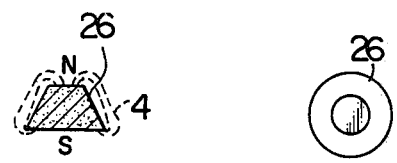

METHOD OF MAGNETOFLUIDIC RECORDING

This is a continuation of application Ser. No. 924,872 filed July 14, 1978 now abandoned.

The present invention relates to a method and an apparatus for nozzleless magnetofluidic recording.

Generally-known promising methods for recording an image or plain paper include an ink recording process having a nozzle for generating flying ink, and a particle transfer process utilizing magnetic powder and a rotational magnetic field and electric field. In the latter process, as disclosed in U.S. Pat. No. 3,914,771, the magnetic powder is moved to a recording point by a rotational magnetic field, and the forward end of the powder chain formed by the magnetic force is brought into contact with the recording paper, so that the particular forward end is transferred to the paper by the electric field, followed by heating and fixing. The former method, on the other hand, has gone through various improvements and has now reached a point where a magnetofluidic material is utilized.

Well-known conventional methods for recording a character or an image by use of the magnetofluidic material will be described below. One of them is disclosed in Japanese Patent Publication No. 17746/74 in which a magnet is disposed oppositely to a magnetic ink surface carrying a magnetofluidic material uniformly arranged onto a support member so that the ink flies onto the recording paper by magnetic force. Another method, disclosed in Japanese Patent Publication No. 15419/76, use an alternating bias magnetic field to vibrate magnetic ink in a nozzle to facilitate generation of flying caused by an electric or magnetic field. According to still another method, as disclosed in Japanese Patent Publication No. 48141/74, the magnetic ink is magnetized at a polarity reverse to that of a driving magnetic pole for driving the magnetic ink electromagnetically, thereby assuring exact recording. There is also a method in which magnetic ink flying from a nozzle is directionally controlled by a magnetic field as disclosed in U.S. Pat. No. 3,510,878.

The above-mentioned conventional methods have the disadvantage that it is difficult to "produce a high-quality recorded image stably". Specifically, in the method using the magnetic powder wherein it is essential to bring the magnetic powder into contact with the recording paper, the S/N ratio is reduced, generally resulting in a lower quality recorded image. In the case of the method using ink, the forward end of the most important nozzle has such a small hole that the nozzle is often clogged with foreign matter in the ink or external dust or by dried ink, thereby making stable recording impossible. Further, it is basically difficult to achieve a compact multi-nozzle system or to control individual nozzles. The method in which a magnetofluidic material flies by magnetic force from a uniform surface requires a great amount of energy. This energy is too large for driving the ink and the excessively high flying speed atomizes the fluid, resulting in a low resolution and low-quality recorded image.

According to the present invention, there is provided a method for producing a high-quality image, which overcomes the disadvantages of the conventional methods. In the invention magnetofluidic material is protruded by a magnetic force and moved by a coulomb force or magnetic force in accordance with an image signal.

Accordingly, one object of the present invention is to produce "a high-quality recorded image stably". The terms "high-quality" mean a high resolution and a high S/N ratio, and the terms "stably" means with substantially no maintenance other than the provision of basic supplies. Further, "a high resolution" means not only a mechanically high-density scanning but also forming the protruded portion with high density, that is, by means of electronic scanning using a multi-stylus.

The above and other objects, features and advantages will be made apparent by the detailed description taken in conjunction with the accompanying drawings, in which:

FIG. 1 is a diagram showing the operating principle of the present invention;

FIGS 2(a) to 2(e) are diagrams showing means for protruding the magnetofluidic material;

FIG. 13 shows distribution of lines of magnetic force;

Figure 1B:
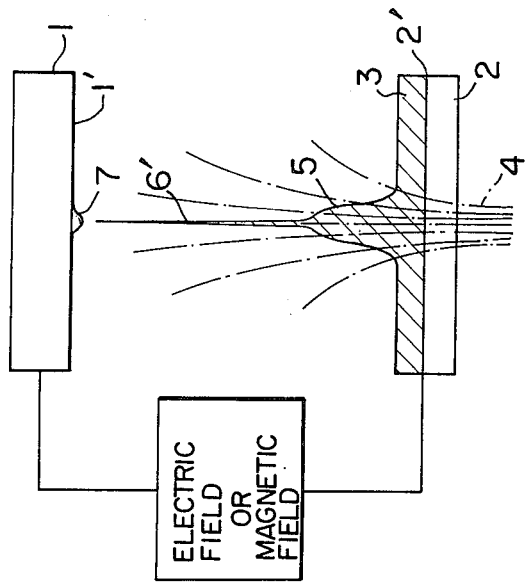

Referring to FIG. 1 showing the principle of recording according to the present invention, reference numeral 1 shows a recording member comprising a support member to which magnetofluidic material moved by a coulomb force or a magnetic force is to be attached. Numeral 1' shows the surface of the recording member or a recording surface. A support member 2 for supporting the magnetofluidic material 3 is arranged in opposed spaced relation to the recording surface. Numeral 2′ shows the boundary between the magnetofluidic material 3 and the support member 2, i.e., the surface of the support member 2, which surface faces the recording surface 1′. Numeral 4 shows lines of magnetic force produced by the magnetic field formed in this configuration. One of the features of this invention lies in the fact that, by use of a magnetofluidic material 3, a protruded part 5 of the magnetofluidic material is formed on the support member 2 along the lines of magnetic force 4 by the magnetic force.

Figure 1A:
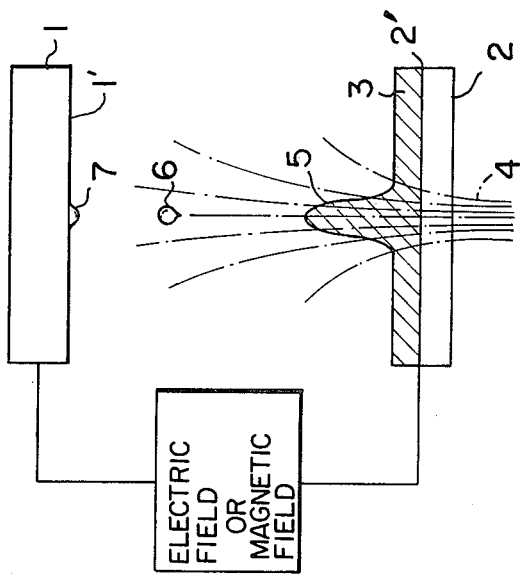

Assume a magnetic field or electric field is applied between the recording member 1 and the magnetofluidic material 3. The part of magnetofluidic material at the forward end of the protruded part 5 is transformed into a particle 6 or a thread 6′ and moved toward the recording surface by a coulomb force or a magnetic force. When it reaches the recording surface as shown in the form designated by 7, a recorded image corresponding to the coulomb or magnetic force applied is produced on the recording surface. Whether the magnetofluidic material takes the form of particle as shown in FIG. 1a or a thread as shown in FIG. 1b depends on the property of the magnetofluidic material and the medium present in the space through which the magnetofluidic material travels. The medium through which the magnetofluidic material moves may take the form of either air or liquid. The moving of the magnetofluidic material in the air is called "flying", and that in a liquid "migration". The description that follows is primarily concerned with flying magneto-fluidic material that is, the moving of the magnetofluidic material in air.

The most conspicuous feature of the present invention is that as long as the lines of magnetic force 4 are produced, the magnetofluidic material, being a magnetic material, is resupplied immediately and restored to its pre-recording state even after consumption of the protruded part 5 by the recording operation. This self-supplying characteristic of the magnetofluidic material eliminates the need of a conventional nozzle with a small jet hole, thus simplifying the construction of the recording section. Further, it is free from any clogging by dirt or dust.

Embodiments of the present invention will be described more in detail. It is essential that the recording member 1 in FIG. 1 have a recording surface, but the recording member itself need not necessarily be made of a conductive or magnetic material. If an insulative material or non-magnetic material such as paper, plastic sheet or cloth is used, for instance, the recording is achieved by providing an electrode or magnetic pole of a metal or similar material on the back of such an insulative or non-magnetic material as the case may be. In the case where the recording member is used as a transfer member, namely, as a medium for final recording, on the other hand, it is effective if the recording surface is made of a smooth material resistant to penetration of the magnetofluidic material. The support member 2 in FIG. 2 is for carrying the magnetofluidic material, and regardless of its shape or substance, may be made of a magnetic material, a non-magnetic material, a conductor, a non-conductor such as a metal or an alloy, glass, ceramics, paper or plastics or a porous alternative thereof. Further, the surface 2′ of the support member 2 is not necessarily parallel to the recording surface but may take a rough form. The magnetofluidic material 3 is made of magnetite ($Fe_3O_4$), γ-ferrite ($Fe_2O_3$), iron powder or other magnetic material or a material containing any of such components, so that it behaves as a magnetic material. In the case where the magnetofluidic material flies in accordance with an applied coulomb force, a magnetofluidic material of high electric conductivity into which electric charges may be easily injected is preferably used. Such a magnetofluidic material may take the form of a mixture of magnetic particles and liquid, fine powder or aerosol. Fine powder, though inferior to other alternatives in fluidity, is free from surface tension and therefore is capable of forming flying particles at a comparatively low voltage.

A desired powder to be used as the magnetofluidic material for making the most of this advantage is in the form of magnetic powder of spherical particles for improved fluidity. Spherical powder particles should have as smooth a surface as possible. The fluidity is expressed by the angle of repose, which in the embodiment under consideration, should be less than 30 degrees to achieve the self-supplying ability as mentioned later. An angle of repose between 30 and 40 degrees is also allowable but fails to provide a stable recording condition. At an angle more than 40 degrees, the self-supplying ability is insufficient, with the result that, without applying any auxiliary energy such as vibrations, a protrusion effective for recording cannot be obtained.

In the case where a mixture of magnetic particles and liquid or aerosol is used as a magnetofluidic material, on the other hand, the high fluidity of the magnetofluidic material contributes to a rapid self-supply, resulting in a very high recording response. Also, if fibrous paper or cloth is used as the recording member, capillarity thereof promotes penetration of the magnetofluidic material into the recording member, thus completely eliminating the fixing operation.

There are a number of factors which affect the self-supplying ability of the magnetofluidic material, i.e., fluidity thereof in a certain magnetic field. Among such factors, those mentioned below have an especially important effect in the recording method according to the present invention. In the method of the present invention, the magnetofluidic material has a higher self-supplying ability, the stronger the saturation magnetization thereof. In other words, the magnetofluidic material is better, the higher the magnetic permeability and saturated magnetization thereof. If liquid magnetofluidic material is involved, the self-supplying ability thereof is higher, the higher the wettability of the magnetofluidic material against the support member or the smaller the interfacial tension or the smaller the viscosity or specific gravity. When the magnetofluidic material is in the form of fine powder, the self-supplying ability is greater, the smaller the angle of repose, specific gravity or size of particles thereof. The factors connected with the self-supplying ability is also closely related to the flying ability of the magnetofluidic material, so that the magnetofluidic material has a greater flying ability, the higher the self-supplying ability thereof.

A process for forming the bulged part of the magnetofluidic material by magnetic force will be described below with reference to FIG. 2. In the drawing, numeral 4 shows the main line of magnetic force, and numeral 5 a protruded part of the magnetofluidic material. As seen from FIG. 2, the protruded part 5 of the magnetofluidic material is attained by forming a line of magnetic force 4 crossing the surface of the magnetofluidic material at right or substantially right angles.

Means explained below are available for producing the line of magnetic force 4. In one method as shown in FIGS. 2a and 2a', a magnet 8 is disposed only at one of the sides of the magnetofluidic material, which magnet may be either a permanent or electromagnet and of course without regard to the polarity thereof. FIG. 2b shows an arrangement of magnets both above and under the magnetofluidic material, in which case the effect of the magnet arrangement is improved by disposing the magnets in opposed polarity relation as shown. FIGS. 2c, 2d and 2e show the cases where the support member 9 is located within the magnetofluidic material. FIG. 2c shows the surface of the support member situated inwardly of the surface of the magnetofluidic material in the absence of magnetic field, FIG. 2d shows the surface of the support member situated in the same plane as that of the magnetofluidic material under the same condition, and FIG. 2e shows the surface of the support member situated outside of the surface of the magnetofluidic material under a similar condition. If the support member 9 is a magnet, it creates the line of magnetic force 4 which in turn forms a protruded part 5 as shown in the drawing. If the support member 9 is made of a magnetic material high in magnetic permeability such as iron, on the other hand, application of a magnetic field in the same manner as in FIG. 2a or 2b causes the line of magnetic force 4 to be formed to create the protruded part as shown. In the case where the support member 9 is of a non-magnetic material and the magnetofluidic material is a liquid, the protruded part 5 is formed by disposing the magnet on the protruding side at least. As noted above, any protrusion-forming means for recording may be selected according to the design of the apparatus. The shape and size of the protruded part depends on the intensity of the magnetic force or the size of the support member 9. By appropriately adjusting these factors, it is possible to form a recording point of the desired magnitude on the recording surface.

Embodiment 1

Figure 3:
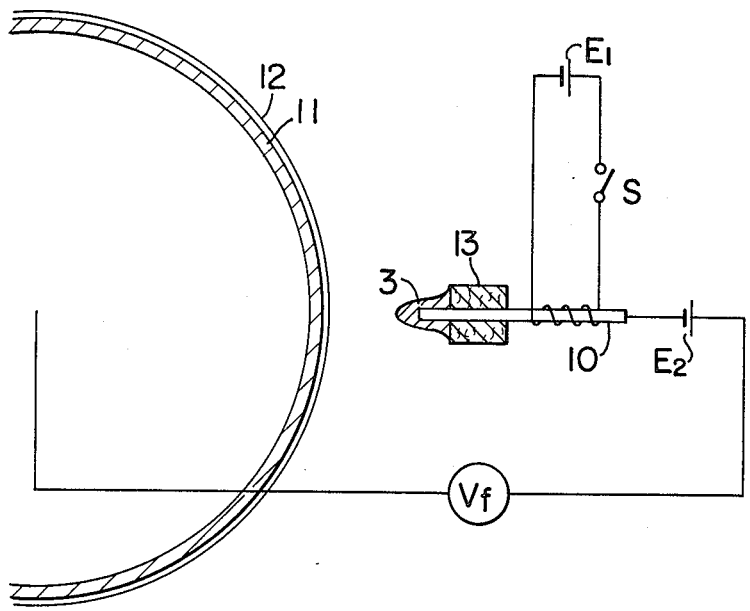
FIGS. 3 to 6 are diagrams showing a configuration of the essential parts embodying the recording method according to the present invention.

An embodiment of the present invention is shown in FIG. 3. In the drawing numeral 3 shows the magnetofluidic material which, in this case, is constituted by Marpomagna FN-40 made by Matsumoto Yushi Co., Ltd. which is $+10^7$ Ω.cm in resistivity, 40 cps in viscosity, 400 Gauss in saturation magnetization, and uses paraffin as a dispersion medium. Numeral 10 shows a pin-shaped recording electrode/magnetic pole made of an iron wire 0.2 mm in diameter. This is used to support the magnetofluidic material and to grow the magnetofluidic material therealong. Numeral 11 shows a metal drum, and numeral 12 a recording member made of quality paper 80 μm thick. Numeral 13 shows felt soaked with the magnetofluidic material. $E_1$ shows a DC power supply for the electromagnet. Upon closing the switch S, the magnetofluidic material is protruded at the forward end of the recording electrode as shown in the drawing. The recording electrode is set 0.8 mm distant from the recording paper. $E_2$ shows a bias voltage source of DC 1.4 KV. With the switch S closed, the roll is turned in such a manner that the main scanning rate is 0.5 m/s and the auxiliary scanning rate is 8 lines/mm, and further an image signal of 700 V and 18 KHz is applied from the image signal source Vf. As a result, a high-quality black image corresponding to the signal is stably produced. The image thus formed has a line width of about 0.1 mm and a high resolution on the one hand and is quite free from background contamination on the other hand. After that the magnetic force of the electromagnet is increased for similar recording process, with the result that an image with a line width of about 0.2 mm very high in contrast, i.e., high in quality is obtained. A similar result is obtained by replacing the electromagnet by a small permanent magnet. In either case, stable recording is accomplished even after leaving the apparatus unused for several days.

As will be understood from the foregoing description, the present invention is for recording an image by protruding and flying a magnetofluidic material by magnetic force which is capable of achieving a constant stable recording operation without requiring any special operations such as draining unused ink or immersing the forward end of the nozzle in the ink tank, which are characteristics of conventional apparatuses using a nozzle. This advantage is derived from the fact that the basic properties of the protrusion remain unchanged since the protruded part is used from the outer part thereof first even when a volatile magnetofluidic material is used and that any dust attached affects only the outer surface of the protrusion, keeping the protrusion properties always stable. Further, unlike conventional apparatuses using a nozzle in which high degree of integration is basically difficult, the present invention which is comprised of such a simple element as pin-shaped electrode can be integrated to high degree by ordinary techniques such as etching or wiring. Also, the finer forward end of the protruded part leads to a higher resolution, thereby greatly contributing to "a recorded image of high quality". As compared with the method in which part of the flat magnetofluidic material flies as recording drops by magnetic force, the present invention has the advantages of "higher quality of recorded image" and "higher stability". In other words, the method according to the present invention consumes less energy for flying the magnetofluidic material from the protruded part thereof, thus avoiding problems associated with atomizing of the magnetofluidic material.

Instead of using coulomb force to create flying particles of magnetofluidic material in the above-mentioned embodiment, magnetic force, wind power or other mechanical force may be utilized, although the use of coulomb force facilitates the design of a multi-stylus more than the use of magnetic force, wind power or mechanical force.

As is obvious from the foregoing description, the present invention obviates the disadvantages of well-known prior art image reducing techniques and has an industrially high value in that a "high-quality recorded image" is stably obtained. Such advantages may be incorporated in recording devices such as facsimiles, printer, recorders and copiers, making the method of present invention applicable in wide fields.

Embodiment 2

Figure 4:
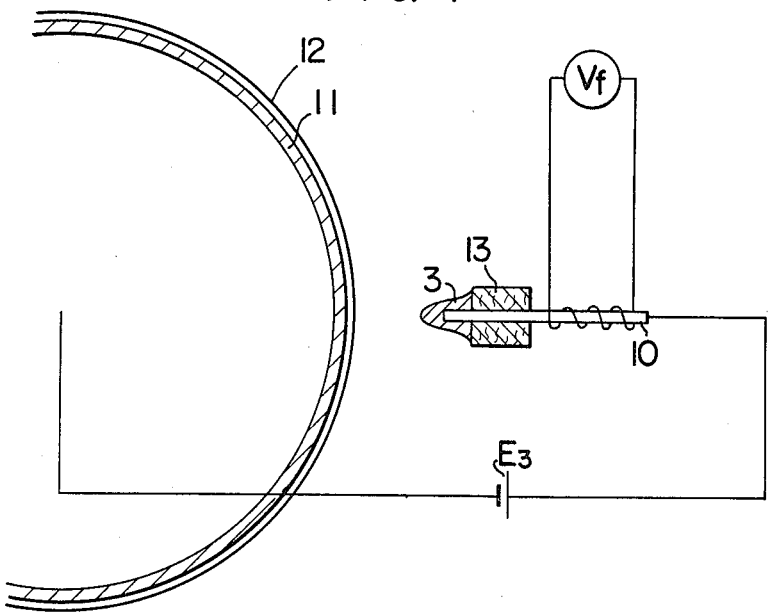

In Embodiment 1, the force for moving the magnetofluidic material is associated with the image signal. By associating the means for growing the magnetofluidic material with the image signal, however, a similar recorded image is obtained. This method reduces the voltage of the image signal. In the configuration shown in FIG. 4, the magnetic force of the pin-shaped recording electrode 2 is controlled by the image signal Vf thereby to control the protruding of the magnetofluidic material 3, thus accomplishing the recording by the flying of the magnetofluidic material. In this case, the metal drum 11 is rotated in such a manner that the main scanning rate of 0.5 m/s is attained while the auxiliary scanning direction is moved at the rate of 8 lines/mm. As an electrostatic field to be applied in advance, 2 KV is applied to the voltage source $E_3$ while applying an image signal of 50 V and 100 Hz, with the result that a high-quality black image is stably produced. The image thus formed has a resolution and contrast almost as high as the image produced in Embodiment 1 above. By increasing the size and the number of turns of the coil wound on the pin-shaped recording electrode, recording of a similar high-quality image is possible even at a lower signal voltage of about 30 V. It is thus seen that according to the present embodiment, there is no need for control at high voltage of image signal but an image signal of low voltage suffices. Further, a much stabler recording operation is possible than Embodiment 1 against noises and external vibrations. This is due to the fact that the presence of the mere electrostatic field is not enough to protrude the magnetofluidic material but the presence of a signal creates a protruded part on the pin-shaped electrode which is required for material flying. In Embodiment 1, by contrast, the magnetofluidic material is protruded regardless of presence or absence of the signal, resulting in the disadvantage that the magnetofluidic material is likely to fly even by a bias voltage due to small noises or vibrations.

Embodiment 3

Instead of the methods employed in Embodiments 1 and 2 wherein an image signal was associated with means for controlling the magnetic force or means for controlling the moving force to form the protruded part to produce an image, it is possible to produce an image with gradations by associating an image signal with both means.

Figure 5:
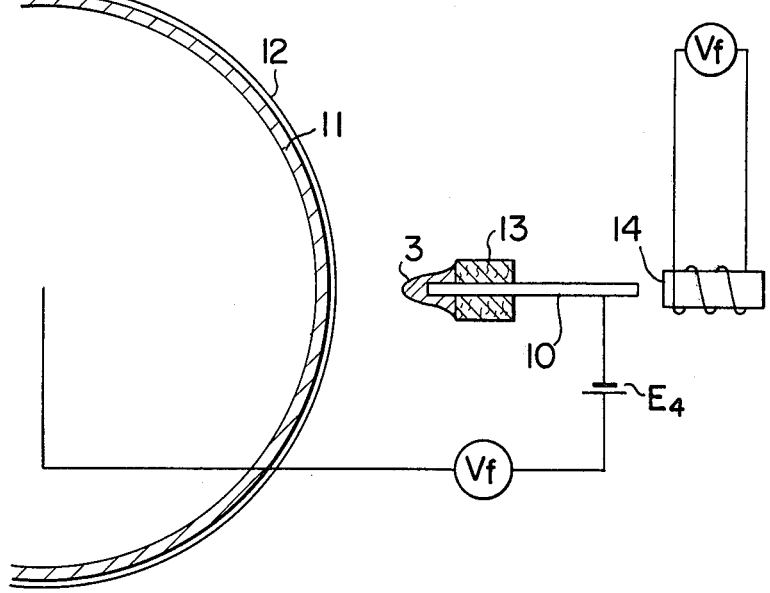

Such a method is shown in FIG. 5. In the drawing, the electromagnet 14 is applied with a voltage from 5 V to 100 V according to the image density, thus changing the amount of the magnetofluidic material protruded on the recording electrode 10. With a bias DC power supply $E_4$ impressed with 1.7 KV, an image signal of 200 V to 800 V is applied in accordance with the image density. As a result, a clear image having seven black gradations is produced.

As seen from above, the magnetic force for protruding the magnetofluidic material is changed in accordance with the image density while at the same time the voltage applied to the recording electrode, is changed thereby producing a clear and stable image with gradations. This indicates that the amount of flown magnetofluidic material depends not only on the magnitude of the moving force such as coulomb force but also on the size of the protruded part of the magnetofluidic material on the recording electrode.

Embodiment 4

Figure 6:
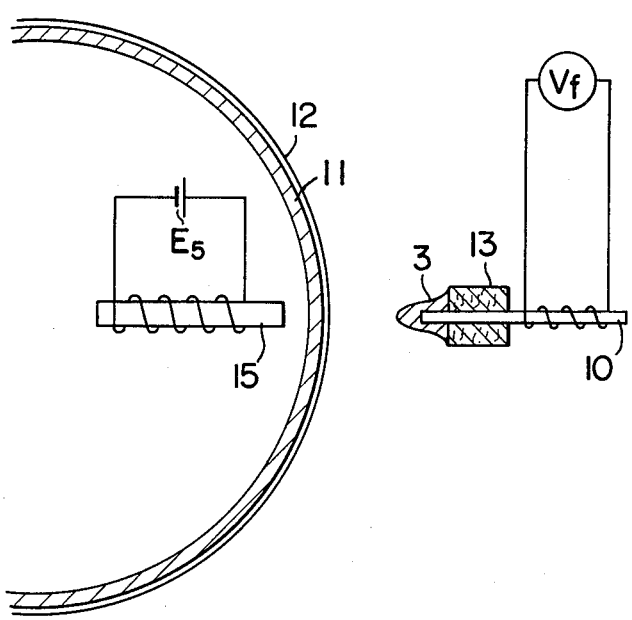

Although the coulomb force due to the electrostatic field is used as a moving force in the preceding embodiment, it is also possible to utilize magnetic force for such a moving force. As shown in the configuration of FIG. 6, the electromagnet 15 is driven by the power supply $E_5$ and an image signal of 50 V applied, thus producing a high-quality image. In this case, numeral 11, designates a hollow drum of polyvinyl chloride. The voltage of the power supply for the electromagnet 15 is about 80 V. Unlike the preceding embodiments, a high-voltage source is not required in this embodiment. In the case where the image signal is a DC pulse signal, however, the polarity of the surface of the electromagnet 15 opposed to the surface of the pin-shaped recording electrode is required to be reverse to the latter by appropriately adjusting the polarity of the power supply $E_5$.

Also in this case, the advance application of an electrostatic field is not necessarily required, but to the extent that the magnetic force of the pin-shaped recording magnetic pole 10 is strong enough, the recording process is possible by providing a drum like of ferromagnetic material in place of the hollow drum of polyvinyl chloride 11 or the ferromagnetic material such as the magnetic core of the electromagnet 15. In other words, recording is possible if the magnetic force of the pin-shaped recording magnetic pole is strengthened even when the power supply $E_5$ is cut off. This is because when magnetic force is generated in the pin-shaped recording magnetic pole, the magnetic pole in opposite polarity to that of the pin-shaped recording magnetic pole is induced in the surface of the ferromagnetic material as if the power supply $E_5$ is turned on. In this case, however, the magnetic force of the pin-shaped recording magnetic pole must be considerably strong, with the result that a large particle of the magnetofluidic material is flown, making satisfactory recording impossible.

In Embodiments 1 to 3, the coulomb force is used as the force for moving the magnetofluidic material. It is also possible to utilize the technique of the control electrode used in the conventional ink jet recording process.

Figure 7A:
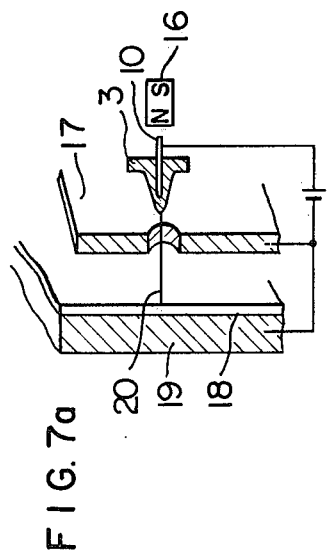
FIG. 7 is a diagram showing the difference in the flying route of the magnetofluidic material depending on the shape of the control electrode.
Figure 7B:
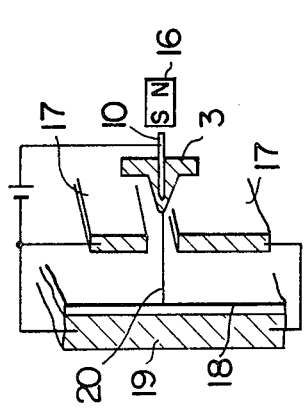
Figure 7C:
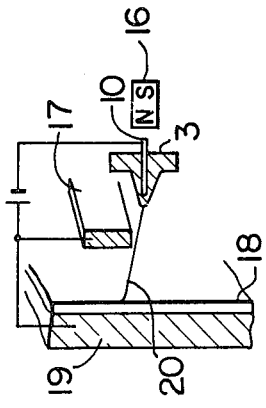

FIG. 7 shows the flying route of the magnetofluidic material depending on the form of the control electrode. Numeral 10 shows a pin-shaped recording electrode, and numeral 3 a magnetofluidic material which is protruded at the forward end of the pin-shaped recording electrode by magnetic force of the magnet 16. Numeral 17 shows a control electrode made of a thin metal plate arranged outside of the line of magnetic force passing through the forward end of the protruded part. Numeral 18 shows the recording paper, and numeral 19 a support member therefor made of an iron sheet. Numeral 20 shows the route of flying magnetofluidic material. In FIG. 7a, a copper plate 0.5 mm thick having a pore 1 to 2 mmφ in diameter is arranged as a control electrode in parallel to the recording surface. In FIG. 7b, a pair of copper plates spaced 1 to 2 mm apart are arranged as a control electrode in the same plane parallel to the recording surface. In FIG. 7c, one of the two copper plates used in FIG. 7b is removed. The forward end of the pin-shaped recording electrode is spaced about 1 mm from the control electrode and a voltage of 2 KV is applied. Even when the control electrode and the recording member are spaced by 5 mm, an image spot is formed by magnetofluidic material flying onto the recording member. As explained above the flying magnetofluidic material route according to the present invention is formed by a vectorial sum of the line of magnetic force and line of electric force, and therefore the formation of the control electrode is not strictly limited and a large allowable range of displacement exists.

Embodiment 5

Figure 8:
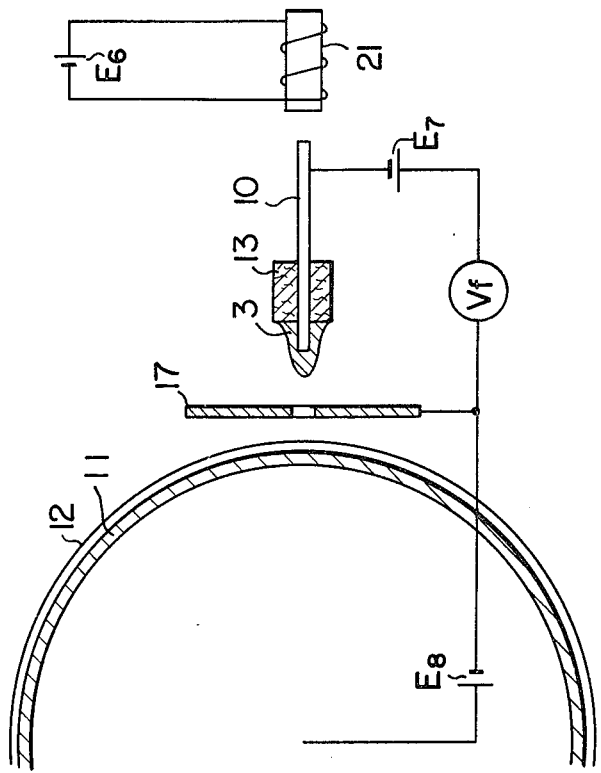
FIG. 8 shows a configuration of the essential parts of an embodiment using the control electrode.

A sectional view of Embodiment 5 according to the invention is shown in FIG. 8. Numeral 10 shows a pin-shaped recording electrode made of an iron sewing needle 0.5 mm in diameter. Numeral 3 shows a magnetofluidic material, numeral 13 is a felt soaked with the magnetofluidic material, and numeral 21 an electromagnet for supplying the forward end of the recording electrode with as much magnetofluidic material as consumed from the felt. Numeral 17 shows a control electrode made of a copper plate 0.4 mm thick having a pore 1.5 mm in diameter, and which is spaced by 1 mm from the recording electrode so that the magnetofluidic material flies through the pore. Numeral 11 shows a metal drum spaced 1 mm from the control electrode. Numeral 12 shows a recording member including a cylinder wound with quality paper. $E_6$, $E_7$ and $E_8$ are DC power supplies of 20 V, 1.8 KV and 200 V respectively. Rotating the cylinder to attain the main scanning rate of 0.5 m/s, an image signal Vf of 600 V is applied, with the result that a clear black image corresponding to the signal is stably produced on the recording paper. Next, the cylinder is spaced 2 mm from the control electrode and the recording operation is performed in a similar manner. Almost the same result as the preceding recording test is obtained.

In the embodiment under consideration, the magnetofluidic material is protruded by the magnetic force on the recording electrode opposed to the recording surface, so that the protruded part flies to the recording surface by coulomb force. By disposing a control electrode between the recording surface and the recording electrode, the recording paper is prevented from contacting the magnetofluidic material. Further, the limitation as to the space between the control electrode and the recording member is relaxed, thus eliminating the requirement of high mechanical accuracy, with the result that an image is recorded always stably and faithfully in correspondence to the image signal. At the same time, with the recording voltage maintained the same, the recording member may be further spaced from the recording electrode, that is, the image signal voltage may be reduced. Also, in view of the fact that the flying route of the magnetofluidic material is associated with the vectorial sum of the line of magnetic force and the line of electric force, an accurate relative positions between the control electrode and the forward end of magnetofluidic material are not required unlike in the conventional ink jet recording process. The result is a wider range of allowance and availability of selection of the desired shape of the recording electrode. Furthermore, the control electrode with a slit as shown in FIG. 7b is especially advantageous in application to the multistylus system having a multiplicity of recording electrodes. In such an application, a drive is possible between a number of slitted control electrodes and the multi-stylus wired in matrix a.

Figure 9:
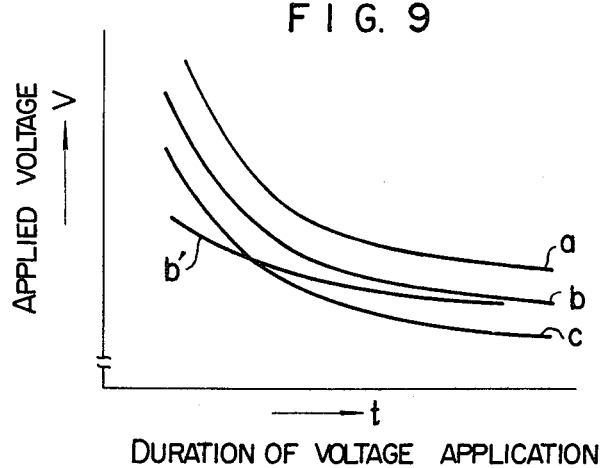
FIG. 9 is a diagram showing the flying response of the magnetofluidic material.

In the recording processes according to the present invention described above, the protrusion of the magnetofluidic material on the recording electrode is essential. The protruded part of the magnetofluidic material has its inherent flying response characteristics according to the shape thereof. In other words, in the case where the protruded part formed by the magnetic force contains much magnetofluidic material, the flying response characteristics thereof is low, while on the other hand the response thereof is high if a small amount of the magnetofluidic material is involved. This flying response is evaluated in terms of the applied voltage or duration of voltage application under certain conditions. In the case where the flying response is low, i.e., the amount of the protruded magnetofluidic material is large, the magnetofluidic material cannot fly without increasing the applied voltage or duration of voltage application. The voltage which causes the magnetofluidic material to fly has a specific threshold value under predetermined conditions, and the duration of voltage application which induces flying of the magnetofluidic material is defined effectively only beyond the voltage threshold. Further, as shown in FIG. 9, the response also varies with the applied voltage. Assuming that rectangular wave or square wave pulses are applied to the protruded part of magnetofluidic material which are maintained constant in amount, an increase in the pulse voltage shortens the duration of voltage application, that is, the pulse width required to start the flying of the magnetofluidic material. Thus, with the increase in the applied voltage, the flying response is improved. The abscissa in the drawing represents the duration of voltage application, and the ordinate the applied voltage, the curves a, b and c being associated with the amount of magnetofluidic material increased in that order. The lowest point of each of the curves or saturated point represents the threshold value of the voltage required to induce the flying of the magnetofluidic material. The flying response can be improved by increasing the applied voltage or by reducing the amount of the protruded magnetofluidic material. If the applied voltage is increased too high, however, the flying route of the magnetofluidic material is dispersed or atomized undesirably. If the amount of the magnetofluidic material is reduced, on the other hand, the image density is inconveniently reduced.

Figure 10A:
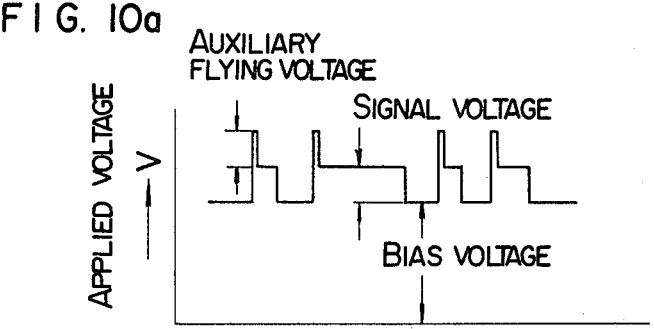
FIG. 10 is a diagram showing voltage waveforms applied to the electrode according to an embodiment of the present invention.
Figure 10B:
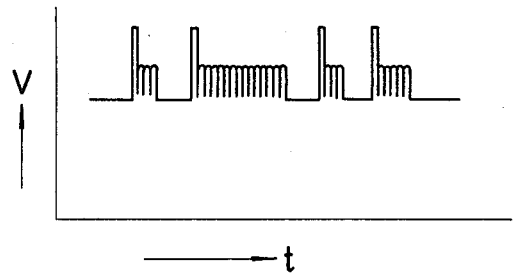

Therefore, a voltage higher than the threshold level of voltage required for flying is employed as the image signal voltage (including the bias voltage), and an auxiliary flying voltage of short duration is superimposed on the rise portion of the image signal, thus improving the flying response for obviation of the disadvantages mentioned above. Actually, a signal as shown in the voltage waveform of FIG. 10 is applied. The bias voltage is a DC voltage lower than the threshold level, and the voltage on which the image signal is superimposed is higher than the threshold level. The image signal in the form of burst pulse as shown in FIG. 10b behaves in a similar manner. The auxiliary flying voltage of short duration is more effective, the higher it is. A satisfactory effect is obtained even if the sum of the bias voltage, image signal and auxiliary flying voltage is lower than the curves in FIG. 9. Also, a pulse signal having many overshoot components obtained after passing a square or rectangular wave through a differentiator circuit with much leak is effective, as seen by the curve b′ in FIG. 9. In this case, however the voltage along the ordinate contains no auxiliary flying voltage. The curve b′ is adapted to be displaced laterally by selection of the auxiliary flying voltage or the duration of application thereof. The effect of such axuliary flying voltage is obvious from the embodiment described below.

Embodiment 6

With the same configuration as in Embodiment 5 (FIG. 8), the main scanning rate is changed to 1.5 m/s for similar recording purpose. (In this case, the image signal width is shortened to one third.) As a result, the flying is considerably delayed behind the signal, and during the thin-line part where the duration of image signal is short, the magnetofluidic material fails to fly. As a result of superimposing an auxiliary flying pulse voltage of 600 V, 50 μs, on the rise portion of the image signal for similar recording purpose, a clear image corresponding to the image signal is recorded. When the auxiliary flying voltage is increased to 1 KV for recording, on the other hand, response to the image signal is obtained even at the main scanning rate of 2 m/s.

It will be noted from the foregoing description that according to the present invention the magnetofluidic material is protruded on the electrode opposed to the recording surface by use of magnetic force, so that the protruded part flies to the recording surface by coulomb force. With the application of the auxiliary flying voltage to the rise portion of the image signal, the image signal voltage is reduced, with the result a stable image high in recording density is recorded at high speed without substantially any atomization of the magnetofluidic material.

It was already explained that one of the features of the recording method according to the present invention is the ability to self-supply the magnetofluidic material. After the protruded part of the magnetofluidic material flies and is consumed for recording, it is resupplied by magnetic force, thus restoring the original protruded form. The rate at which the protruded part is restored to the original form is one of the factors affecting the recording response or recording speed. Another factor which affects the recording speed is the amount of magnetofluidic material of the protruded part, or strictly speaking, the radius of the forward end of the protruded part.

According to the present invention, by a proper combination and arrangement of magnetic poles, the speed of restoration of the protruded part is improved in such a manner that the radius of the forward end of the protruded magnetofluidic material is adapted to high-speed recording.

Figure 11A:
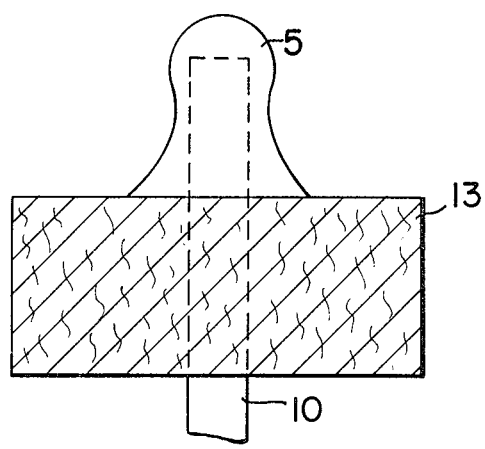
FIG. 11 is a diagram showing forms of protruded magnetofluidic material.
Figure 11B:
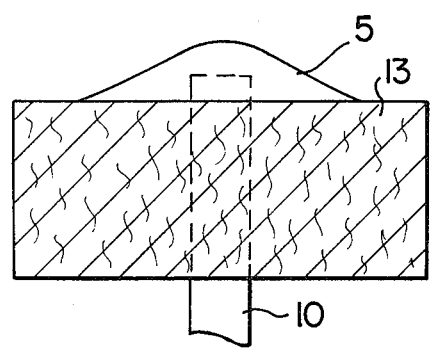
Figure 12:
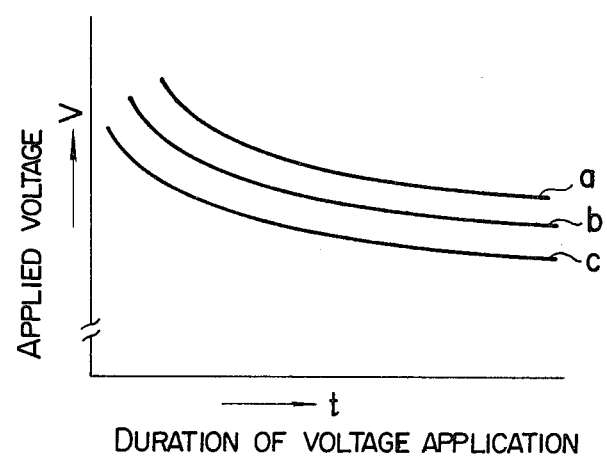
FIG. 12 is a diagram showing flying response characteristic of the magnetofluidic material.

In Embodiments 1 to 5, the means for protruding the magnetofluidic material apparently includes only one magnetic pole. The form of the magnetofluidic material protruded by magnetic force is shown in FIG. 11. The drawing under consideration shows that the protruded form of the magnetofluidic material changes with the position of the source 13 of the magnetofluidic material. FIG. 11a shows the case in which the source of the magnetofluidic material is spaced considerably from the forward end of the pin-shaped magnetic pole. In this embodiment, the forward end where the density of the lines of magnetic force is highest is spherical in shape, and a thin neck is formed between the forward end and the source of magnetofluidic material. With the source of magnetofluidic material placed nearer to the forward end of the magnetic pole as shown in FIG. 11b, the thin neck disappears so that the protruded part takes the form of a gently-sloped hill. Comparing the radius of curvature of the forward ends of the protruded parts in FIGS. 11a and 11b with each other, it is noted that the radius of curvature in FIG. 11b is larger than that in FIG. 11a. It is already explained that the recording speed is dependent on the speed of restoration of the protruded form and the radius of curvature of the forward end of the protruded part. In the case where the radius of curvature of the forward end of the protruded part is changed so that the magnetofluidic material of the protruded part is flown by the coulomb force corresponding to the rectangular pulse, for instance, the result as shown in FIG. 12 is obtained. In this drawing, the abscissa shows the width of applied pulse voltage, i.e., the duration of voltage application, that is the time required for the magnetofluidic material to begin to fly, while the ordinate represents the applied voltage proportional to the coulomb force. In the drawing, curves a, b and c are associated with the radius of curvature of the forward end of the protruded part in descending order. This diagram indicates that the smaller the radius of curvature of the forward end of the protruded part, the easier the magnetofluidic material flies. The speed of restoration of the protruded form, on the other hand, is determined by the intensity of the magnetic force acting on the magnetofluidic material source. When this magnetic force is weak, the neck as shown in FIG. 11a is formed, and the resulting slow restoration speed and the reduced amount of the flying magnetofluidic material causes thinned record or fogging. If the magnetic force affecting the magnetofluidic material source is too strong, by contrast, the radius of curvature of the forward end of the protruded part is increased as shown in FIG. 11b, thus requiring a longer period of time for the magnetofluidic material to fly to the extent that the applied signal voltage is limited. As explained above, for adaptation to the high-speed recording, the radius of curvature of the forward end of the protruded part is required to be small on the one hand and the restoration speed must be high on the other hand. The mere increase in magnetic force or changing the position of the magnetofluidic material source is not sufficient for high-speed recording.

Figure 14A:
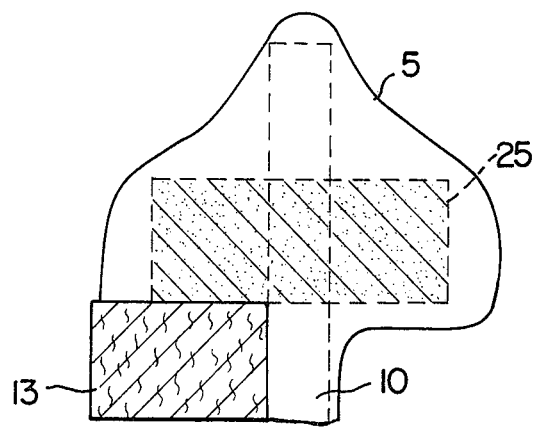
FIG. 14 is a diagram showing the forms of the magnetofluidic material protruded by the lines of magnetic force in FIG. 13.
Figure 14B:
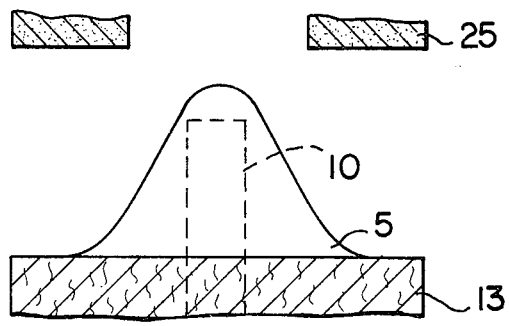
Figure 14C:
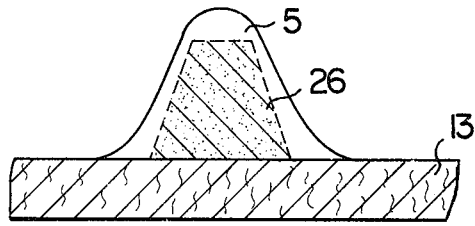

The inventors arranged a separate magnetic pole in the neighbourhood of the magnetic pole surface supporting the protruded magnetofuidic material in order to ovbiate the above-mentioned problems, thus lessening the radius of curvature of the forward end of the protruded part and improving the restoration speed. The diagram of FIG. 13 shows a basic distribution of the lines of magnetic force according to the present invention. FIGS. 13a and 13b show the case in which a magnetic pole of opposite polarity is placed in the neighbourhood of the surface of the magnetic pole supporting the protruded magnetofluidic material, and FIG. 13c shows a distribution of the lines of magnetic force when a magnetic pole of the same polarity is located nearby. Numeral 10 shows a thin wire of magnetic material, numeral 22 a conductor, numeral 23 a DC power supply, numeral 24 lines of magnetic force, and numerals 25 and 26 small permanent magnet pieces. As seen from FIG. 13, the feature of the present invention lies in that the lines of magnetic force produced from the surface of the magnetic pole supporting the protruded magnetofluidic material are so affected by the separately provided magnetic pole as to be concentrated in mountain form. A similar effect is of course achieved if the polarity designated in FIG. 13 is reversed. Although the permanent magnets in FIGS. 13a and 13b are in the shape of rectangular parallelepiped, any desired shape may be selected. As noted above, according to the invention, the shape, size, position and polarity of the magnet may be changed as desired, and at least part of the lines of magnetic form produced from the surface of the magnetic pole is transformed into spherical shape by the effect of a separate magnetic pole. The protruded magnetofluidic material formed by the magnetic force in FIG. 13 is shown in FIG. 14. As seen from FIG. 14, the present invention is such that an additional magnetic pole different from the existing magnetic pole functions in such a manner that the neck portion is eliminated, thus producing a protruded portion with a small radius of curvature of the forward end thereof. In the case of FIG. 14a, though producing the same effect as in FIG. 14b, if the small magnet is placed too near to the protruded part of the magnetofluidic material, the magnetofluidic material is undesirably attached to the magnet, thus making it impossible to produce a desired form for the protruded part. Therefore, the position of the magnet must be adjusted appropriately. In the cases of FIGS. 14a and 14c, on the other hand, the space between the magnetic poles of opposite polarities affecting each other is required to be properly adjusted in order to maintain the protruded form as shown in the drawing. If the space is too wide, the protruded part is inconveniently formed with the neck as shown in FIG. 11a.

Embodiment 7

Figure 15:
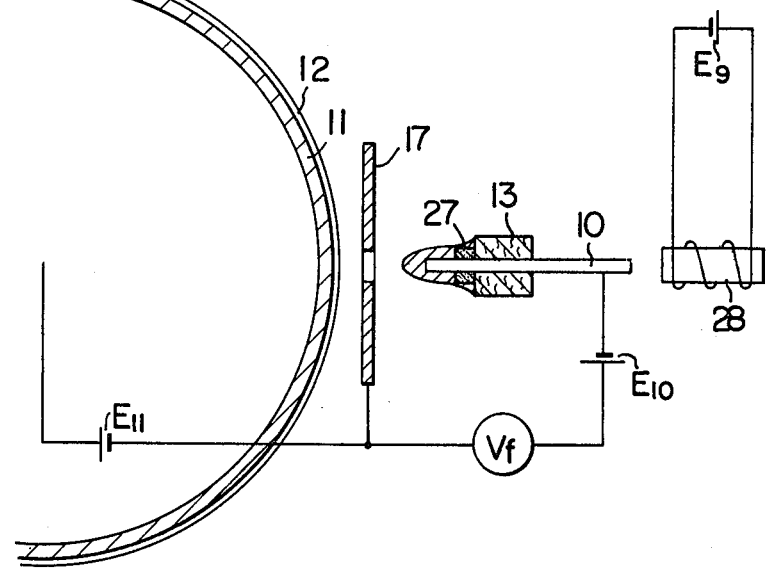
FIG. 15 is a diagram showing a configuration of the essential parts of an embodiment of the present invention.

Embodiment 7 of the present invention will be described with reference to the sectional view of FIG. 15. In the drawing, reference numeral 27 shows a magnet sheet 2 mm×2 mm in size and 1 mm thick which is magnetized in the lateral direction in the drawing. Through the central part of this magnet sheet 27, a pin-shaped recording electrode 10 is passed and brought into contact with the magnetofluidic material source 13 located at a point 1.5 mm from the forward end of the electrode 10. Numeral 28 shows an electromagnet and $E_9$, $E_{10}$ and $E_{11}$ designate DC power supplies. In this configuration, upon application of an image signal under the same condition as in Embodiment 5, a clear image free from unevenness or thinned parts is obtained in the high-speed recording at the main scanning rate of 1.5 m/s. In the configuration of Embodiment 5 in which the magnet sheet 5 is removed and the ink source 13 is placed nearer to the forward end of the recording electrode, on the other hand, the limit of the main scanning rate for producing a clear image is 0.5 m/s, and the high-speed recording beyond that limit is accompanied by a delayed flying of the magnetofluidic material or uneven record density. Further, the shorter part of the image signal fails to cause the flying of the magnetofluidic material, resulting in recording failure.

Figure 16:
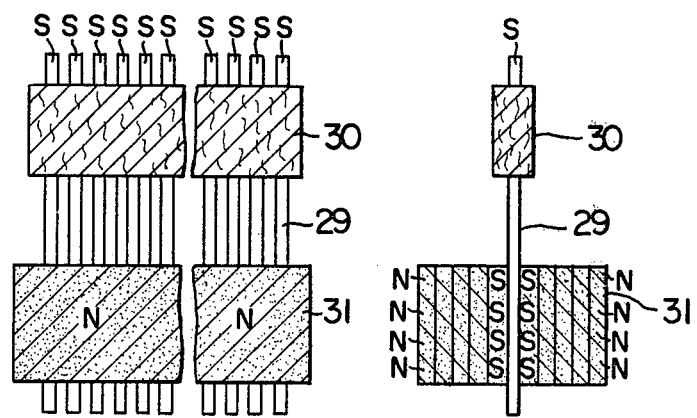
FIGS. 16 to 20 are diagrams showing a configuration and protruded forms of the magnetofluidic material in the case where the present invention is applied to a multi-stylus head.
Figure 17A:
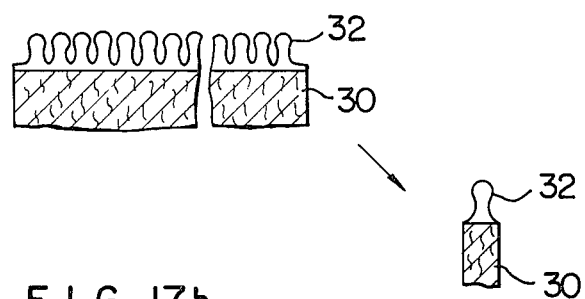
Figure 17B:
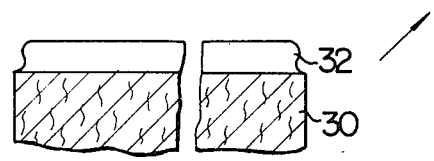

Next, the reason why the small magnet placed near the forward end of the recording electrode as mentioned in this embodiment has an especially advantageous effect on the multi-stylus head including a multiplicity of recording electrodes will be explained. The configuration of the multi-stylus head and the protruded form of the magnetofluidic material in the absence of the small magnet are shown in FIGS. 16 and 17. In the drawings, numeral 29 shows an iron-cobalt-nickel alloy wire 0.2 mm×0.2 mm in size and 18 mm long. Such alloys are arranged in the number of more than one hundred at the intervals of 0.2 mm. Numeral 30 shows a felt soaked with the magnetofluidic material and located 1 mm distant from the forward end. Numeral 31 shows magnet sheets of 5 or 6 layers to increase the magnetic force. Numeral 29 shows wires including a portion 10 mm from the forward end where the magnet sheets 31 are fixed by a bonding agent. A lead wire is soldered to each wire so that a voltage is separately applicable thereto, thus producing a recording multi-stylus head. Each protruded part 32 of the magnetofluidic material of the head takes the form as shown in FIGS. 17a and 17b. The form of FIG. 17a is realized only when the amount of the protruded magnetofluidic material is limited appropriately. If the magnetofluidic material more than that is supplied to the forward end, the protruded parts of the magnetofluidic material are connected with each other in strip as shown in FIG. 17b, with the result that the protruded parts, i.e., flying spots cannot be separated, thus making it impossible to form an image. The protruded form of FIG. 17a has a neck and therefore is slow in restoration as mentioned already. Further, in such a configuration, an external force such as vibration causes the adjacent protruded parts to contact each other, with the result that the protruded parts are likely to be connected with each other into the form as shown in FIG. 17b, making it difficult to maintain the stable form of FIG. 17a.

Figure 18:
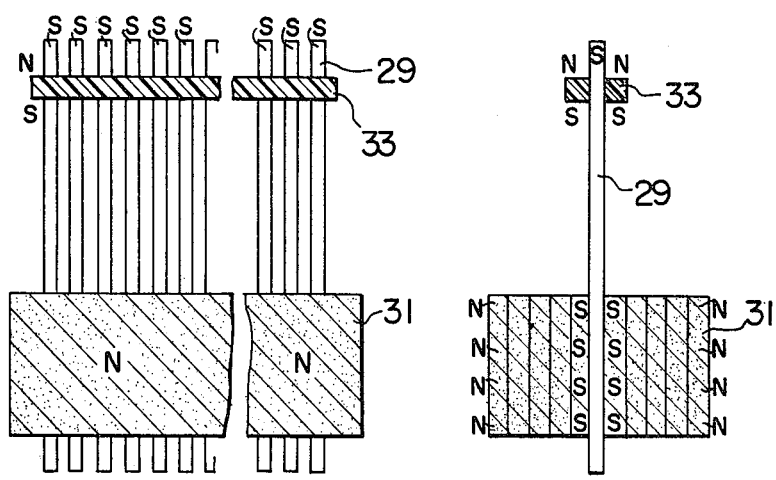
Figure 19A:
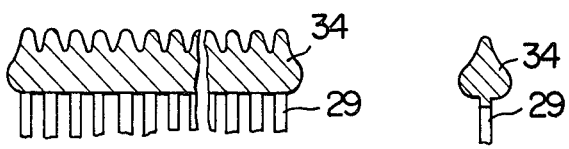
Figure 19B:
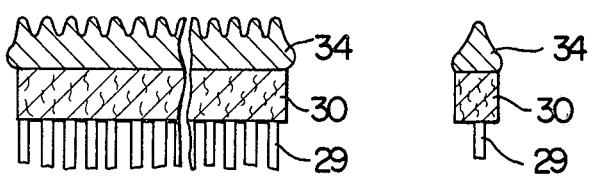

An embodiment of the present invention in which a small magnet is placed in the neighbourhood of the forward end of the recording electrode for use with the multi-stylus head is shown in FIG. 18. In the drawing, numeral 33 shows a magnet sheet of rubber, plastics or alloy sliced into a thinner sheet and fixed by a bonding agent at a point 1 mm distant from the forward end of the iron-cobalt-nickel alloy wire, so that the magnetofluidic material in the amount corresponding to the magnetic force of the magnet sheet is capable of being re-supplied. The diagram of FIG. 18 illustrates the condition in which the magnet sheet 33 doubles as a means for holding the magnetofluidic material and an ink source. The protruded parts as shown in FIG. 19 are formed by the multi-stylus head. The protruded part corresponding to each stylus is formed in compact fashion without any neck. FIG. 19b shows the ink source 30 placed adjacent the magnet 33 of FIG. 18. The construction according to this method is resistant to such external forces as vibrations, and adjacent protruded parts are prevented from being connected with each other, thus making it always possible to identify protruded parts, i.e., flying points associated with styluses for a stable maintenance of the form.

Figure 20:
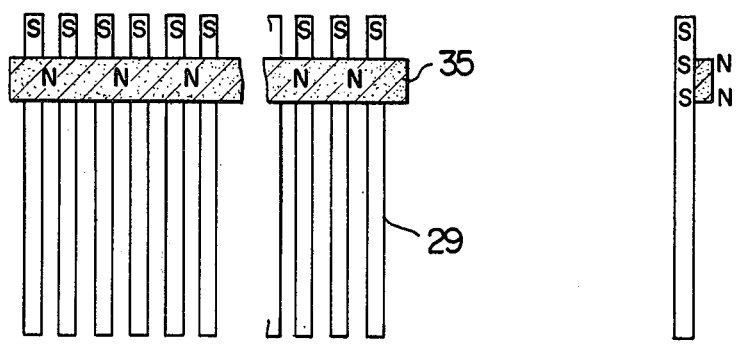

There are many other methods of arrangement of the magnetic poles on the multi-stylus head according to the present invention. In the embodiment of FIG. 18, for example, in which the magnets 33 are attached to both sides of the multi-stylus, one of the magnets is removed and the magnetofluidic material is protruded. In this case, a mountain-shaped protruded part lacking one side thereof is formed without any connection with an adjacent protruded part, thus maintaining a stable shape and the same effect. Still another embodiment of the invention which is most simple in construction with equal effect is shown in FIG. 20. Numeral 35 shows a thin strap of magnetic sheet magnetized in the direction perpendicular to the page and fixed in the neighbourhood of the multi-stylus by a bonding agent at the shown polarity. This magnet holds ink and functions as ink source.

As explained above, according to the invention, an additional magnetic pole is disposed in the neighbourhood of the forward end of the recording magnetic pole, i.e., recording electrode, and by use of the magnetic force formed by such an additional magnetic pole, the magnetofluidic material is protruded on the surface of the magnetic pole. Thus, the radius of curvature of the forward end of the protruded part is reduced on the one hand and the protruded part is restored in shape more quickly on the other hand, resulting in a stable and high-quality recorded image. Also, in the case involving a plurality of protruded parts arranged close to each other, adjacent protruded parts are prevented from being connected and are always maintained separately. As a result, each protruded part behaves independently against the image signal, so that an image is recorded at higher speed and more stably by means of a plurality of densely-arranged flying points.

In most of the recording processes according to the present invention described above, a static magnetic field is exerted on the magnetofluidic material to protrude the same. An alternative recording method is possible by using a dynamic magnetic field for producing the magnetic force to protrude the magnetofluidic material. By so doing, the flying of the magnetofluidic material is further facilitated, thus leading to a clearer recorded image. The method using such a dynamic magnetic field will be described below.

The dynamic magnetic field in this invention is primarily for altering the protruded form of the magnetofluidic material periodically or for facilitating the supply of ink and is generally easily obtained by subjecting the electromagnet to pulse drive or AC drive. Also, by synchronizing the dynamic magnetic field with the image signal, the record is rendered clearer. The dynamic magnetic field synchronized with the image signal means that magnetofluidic material is protruded by the action of the dynamic magnetic field the instant the record is made by the image signal. The frequency of the dynamic magnetic field may be an integral multiple of that of the image signal per unit recording stylus. By using such a dynamic magnetic field, the image is recorded easier and clearer. Another feature of the present invention is that by driving a record control circuit based on matrix drive system between the signal for protruding using the dynamic magnetic field and the stylus signal for supplying the flying energy, the multi-stylus recording is greatly facilitated.

Figure 21A:
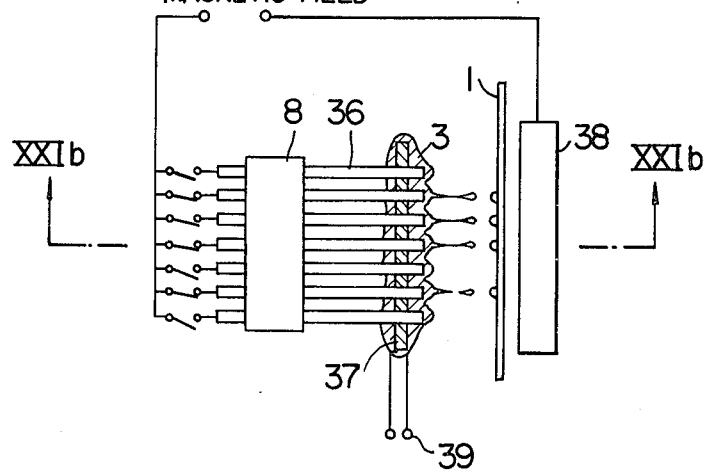
FIG. 21 shows a configuration of the case where the method for protruding the magnetofluidic material by a dynamic magnetic field is applied to the multi-stylus head.
Figure 21B:
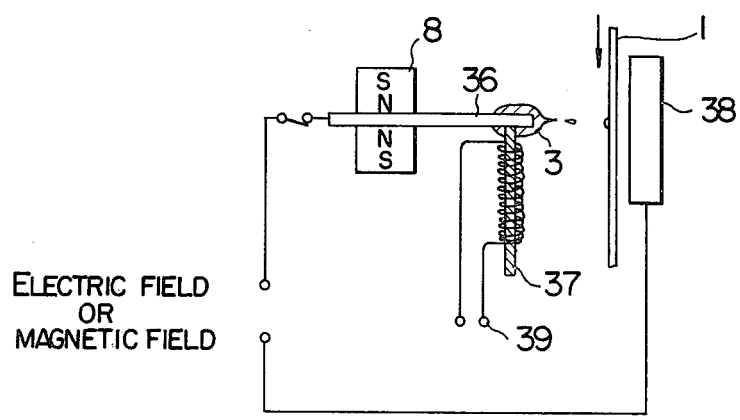
Figure 22A:
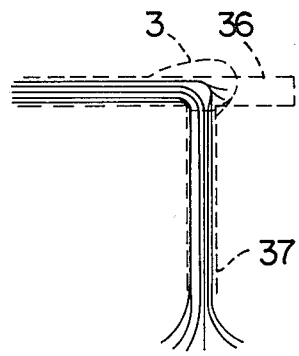
FIG. 22 is a diagram showing a magnetic circuit of the embodiment in FIG. 21.
Figure 22B:
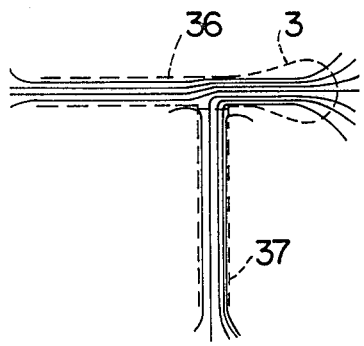

The embodiment under consideration is configured as shown in FIG. 21. In the drawing, FIG. 21a is a plan view, and FIG. 21b an elevational view. Numeral 8 shows a magnet, numeral 36 a multi-stylus head of an iron-cobalt-nickel alloy, and numeral 37 an electromagnet for creating a dynamic magnetic field, which is located at a point 1 mm from the forward end of the multi-stylus head at right angles thereto. Numeral 38 shows a rear electrode or rear magnetic pole, and numeral 39 an input terminal connecting a power supply for driving the electromagnet 37. In this configuration, by placing the magnetofluidic material 3 at the intersection of the multi-stylus head and the electromagnet, the protruding of the magnetofluidic material at the forward end of the multi-stylus head is controlled by the dynamic magnetic field created by the electromagnet 37. This fact is explained with reference to the magnetic circuit shown in FIG. 22. While the electromagnet is not working, the lines of magnetic force in the magnetized recording stylus 36 flow toward the core of the electromagnet high in magnetic permeability, thus drawing the diagram of lines of magnetic force as shown in FIG. 22a. Also, in the case where the magnetic polarities of the recording stylus 36 and the electromagnet 37 are opposite to each other at the intersection thereof, the same lines of magnetic force are formed as in FIG. 22a. In any of these cases, much magnetofluidic material is attached to the intersection, so that no magnetofluidic material is protruded at the forward end of the recording stylus 36. When, on the other hand, a voltage is applied to the power terminal 39 such that the magnetic polarities of the recording stylus 36 and the electromagnet 37 are the same at the intersection thereof, the lines of magnetic force as shown in FIG. 22b are formed, with the result that the magnetofluidic material is strongly protruded at the forward end of the recording stylus 36. Therefore, the power supply 39 supplies a coil current in such a direction that the magnetic polarities of the recording stylus 36 and electromagnet 37 are identical at the intersection thereof. By on-off control of this coil current (generation of magnetic pulses) or by analog control, a dynamic magnetic field is generated. A similar dynamic magnetic field used for the invention may be created by AC drive of the power supply 39. In the method shown in FIG. 21, the magnetofluidic material 3 alternates between protruding and deflation for oscillation in synchronism with the dynamic magnetic field of the electromagnet at the time of recording. During the protruding of the magnetofluidic material, it flies or migrates in response to the synchronous image signal, thus forming a recorded image.

Figure 23:
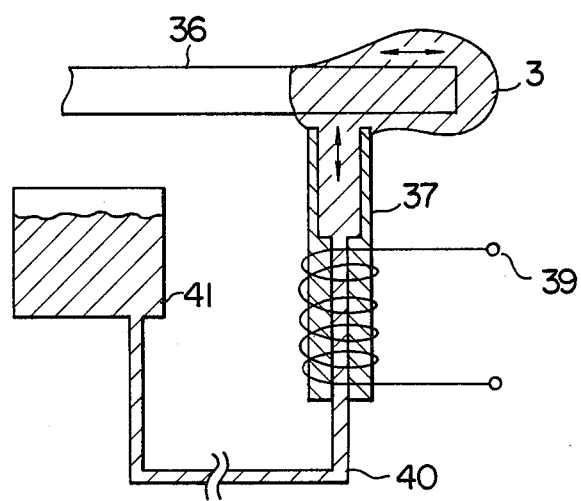
FIG. 23 is a diagram showing a method for supplying the magnetofluidic material.

Further, if a supply pipe 40 for supplying the magnetofluidic material 3 is provided in the magnetic core of the electromagnet 37 forming the dynamic magnetic field, the magnetofluidic material is easily supplied from the magnetofluidic material source 41, thus facilitating the supply thereof in accordance with the change in dynamic magnetic field. Such a situation is shown in FIG. 23. If the magnetofluidic material is in liquid form, the amount of supply may be stabilized by providing a porous material such as felt, sponge or porous glass in the supply route.

The method for controlling the protrusion due to the dynamic magnetic field described above may be combined with the method for controlling the protrusion due to the small magnet disposed in the neighbourhood of the forward end of the recording electrode mentioned in Embodiment 7, so that a matrix is formed between the dynamic magnetic field signal and the signal applied to the recording electrode, thus making possible a matrix drive recording using the multi-head. Such an embodiment will be explained below.

Embodiment 8

Figure 24:
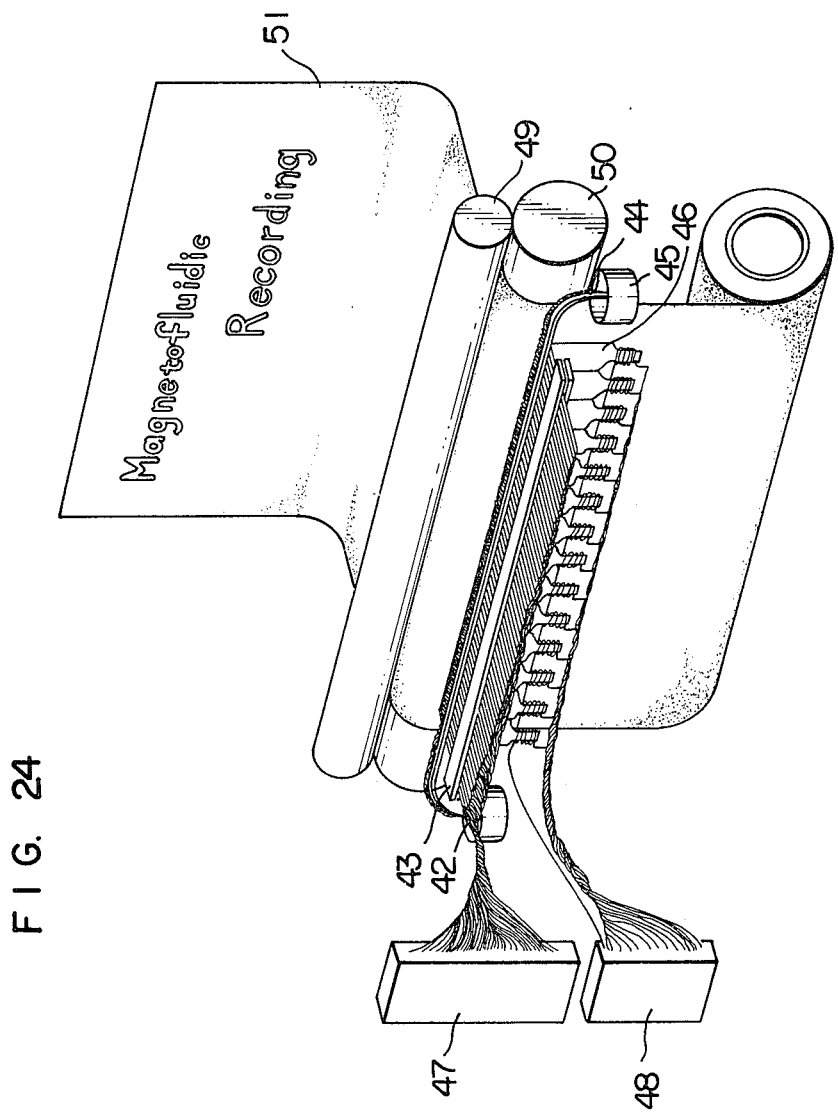
FIG. 24 is a diagram showing a recording apparatus capable of being driven in matrix as the present invention is applied to the multi-stylus head.
Figure 25:
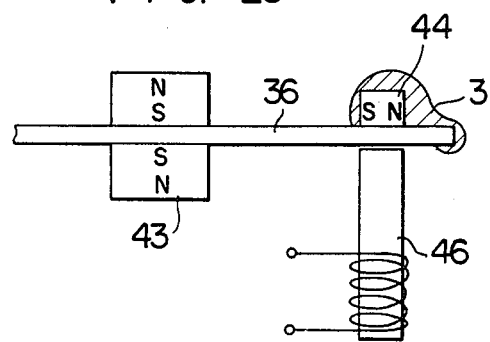
FIG. 25 shows a configuration of the multi-stylus head.

As shown in FIG. 24, this embodiment comprises 448 element multi-stylus 42 made of 80$\mu$ nickel wires arranged at the density of six wires per mm, a permanent magnet 43 and a leading magnet 44. The magnetofluidic material is supplied from the tank 45 by utilizing the ability thereof to attach to the surface of the leading magnet 44. The core which is divided into 14 blocks is wound with coils to form an electromagnet 46 for supplying a dynamic magnetic field. The multi-stylus is wired in matrix and lead wires are taken out and connected to the connector 47. In similar fashion, lead wires are also taken from the electromagnet and connected to the connector 48. The drive roller 49 for this apparatus, while being pressed in contact with the metal roller 50, is driven at the speed of 8.7 mm/s, so that a bias voltage of 1.2 KV, a signal voltage of 800 V, and an image signal with pulse width of 300 $\mu$s, 50 Hz are applied between multi-head and the metal roller. And an AC half-wave signal of 80 V, 50 Hz in synchronism therewith is applied to the electromagnet. Thus, a clear image is produced on the recording paper 51. In other words, the recording method under consideration is such that the magnetofluidic material flies only upon simultaneous application of the image signal and the dynamic magnetic field signal to the recording electrode. The multi-stylus head is configured as shown in FIG. 25. The leading magnet 44, in cooperation with the permanent magnet 43, forms a small mountain-shaped protruded part at the rate of 6 protrusions per mm corresponding to the recording electrodes, and also functions as a supply route for the magnetofluidic material.

In the foregoing description, the moving of magnetofluidic material is limited to the flying in the air. Moving, however, is also possible in a medium of liquid form, in which case the moving of the magnetofluidic material is called migration.

Figure 26:
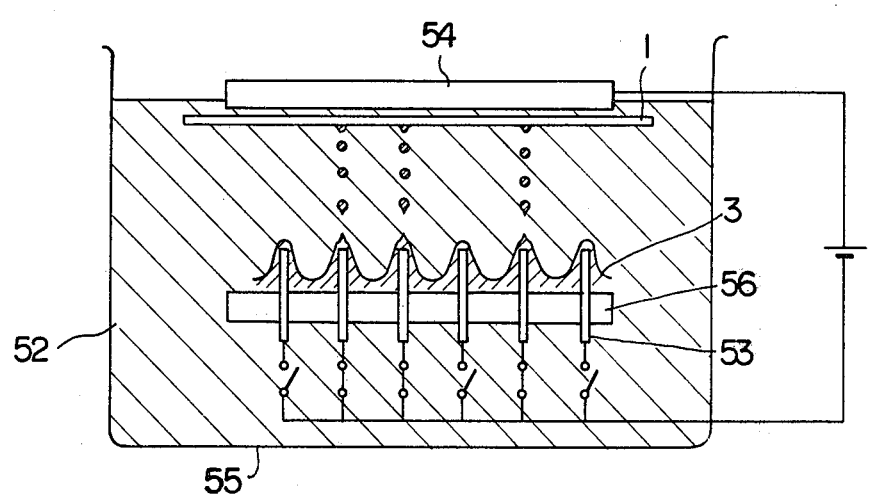
FIG. 26 is a diagram showing the essential parts of an embodiment of a recording method utilizing the migration of the magnetofluidic material in liquid.

In FIG. 26, the magnetofluidic material 3 is protruded as shown by the magnetic force of the pin-shaped magnetic pole 53. This magnetofluidic material may take the form of either solid particles or liquid. In the case of the magnetofluidic material in liquid form, however, the medium liquid 52 is required to be one which is hard to mix with the magnetofluidic material. When the magnetofluidic material is migrated by coulomb force, the higher the dielectric constant of the medium liquid 52, the lower the voltage required for migration, thus facilitating the recording operation.

The pin-shaped magnetic pole 53 may be comprised of a needle-shaped magnet or a magnet in contact with a needle of such ferromagnetic material as iron, nickel or like. Numeral 54 shows a rear electrode or rear magnetic pole used on the back of the recording member 1, which makes up an opposite pole for migrating the magnetofluidic material from the protruded part on the pin-shaped magnetic pole 53. In this way, the magnetofluidic material may be migrated either magnetically or electrically, although the migration is controlled more easily when using the coulomb force derived from an electric field. In this case, the pin-shaped magnetic pole also functions as the electrode to supply an electrical signal.

Embodiment 9

A further embodiment will be described. In the container 55 containing paraffin as a medium liquid 52, an epoxy substrate 56 having a pin-shaped magnetic pole 53 including a magnet needle is disposed, and a magnetofluidic material is placed on them. Further, as shown in FIG. 26, the recording member 1 making up a recording paper and a rear electrode are disposed in the medium liquid. The forward end of the pin-shaped magnetic pole is spaced 3 mm from the recording paper and an image signal of 500 V, 50 Hz is applied between the rear electrode and the pin-shaped magnetic pole, resulting in a clear image being formed on the recording paper.

In view of the fact that migration in the magnetofluidic material of liquid form is used, a clear image free from background fog is produced at a voltage low as compared with that required for flying in the air.

The medium liquid is preferably colorless and transparent, but not necessarily so if lacking in affinity with the surface of the recording member.

What we claim is:

1. A method for nozzleless magnetofluidic recording comprising the steps of providing a magnetofluidic material on the surface of a nozzleless support member for emitting a concentrated magnetic flux, said support being disposed opposite to and facing a recording surface, applying a magnetic force by at least the concentrated magnetic flux emitted from said nozzleless support member to said magnetofluidic material to cause a protrusion of said magnetofluidic material from said surface of said support member in a direction toward said recording surface, said protrusion being free from contact with said recording surface, applying an electrostatic or magnetic flinging or migrating force between said support member and an opposing pole provided near said recording surface to fling or migrate magnetofluidic material from a protruded part of said protruded magnetofluidic material to said recording surface, and producing a recording image by causing at least one of said magnetic force or said flinging or migrating force to vary in correspondence with a recording signal.

2. A method for nozzleless magnetofluidic recording according to claim 1, wherein said flinging or migrating force is a coulomb force.

3. A method for nozzleless magnetofluidic recording according to claim 2, wherein said coulomb force is applied to said protruded part of said magnetofluidic material by an electric field applied between said recording surface and said surface of support member opposed to said recording surface.

4. A method for nozzleless magnetofluidic recording according to claim 2, wherein said coulomb force is applied to said protruded part of said magnetofluidic material by an electric field created between said surface of the support member and a control electrode, which is disposed between said recording surface and said surface of the support member opposed to said recording surface.

5. A method for nozzleless magnetofluidic recording according to claim 1, wherein said flinging or migrating force is a magnetic force.

6. A method for nozzleless magnetofluidic recording according to claim 5, wherein said flinging or migrating force is a magnetic force which does not contribute to the formation of said protruded part.

7. A method for nozzleless magnetofluidic recording according to claim 5, wherein said magnetic force which does not contribute to the formation of said protruded part is a magnetic force produced by a source of magnetic force disposed on the back side of said recording surface.

8. A method for nozzleless magnetofluidic recording according to claim 2 or 5, wherein said magnetic force for protruding said magnetofluidic material is generated by a magnetic pole disposed in the neighbourhood of said surface of said support member.

9. A method for nozzleless magnetofluidic recording according to claim 8, wherein said surface of said support member is made of a magnetic material.

10. A method for nozzleless magnetofluidic recording according to claim 2 or 5, wherein said magnetic force for protruding said magnetofluidic material is the sum of a magnetic force generated from said surface of said support member opposed to said recording surface and a magnetic force generated from a magnetic pole disposed in the neighbourhood of said surface of said support member.

11. A method for nozzleless magnetofluidic recording according to claim 2 or 5, wherein an auxiliary signal is superimposed on the rising portion of said recording signal.

12. A method for nozzleless magnetofluidic recording according to claim 2 or 5, wherein said magnetic force for protruding said magnetofluidic material is generated by a dynamic magnetic field.

13. A method for nozzleless magnetofluidic recording according to claim 1, wherein said magnetofluidic material is protruded and flung in air.

14. A method for nozzleless magnetofluidic recording according to claim 1, wherein the protrusion and movement of said magnetofluidic material is a migration in a dielectric material in liquid form not mixed with said magnetofluidic material.

15. A method for nozzleless magnetofluidic recording according to claim 1, wherein a magnet is provided stretching from a magnetofluidic material source to said surface of said support member and/or the neighborhood thereof for generating magnetic force guiding said magnetofluidic material from a magnetofluidic material source to said surface of said support member and/or the neighborhood thereof opposed to said recording surface.

16. A method for nozzleless magnetofluidic recording according to claim 2 or 5, wherein said surface of said support member includes a magnetic stylus.

17. An apparatus for nozzleless magnetofluidic recording comprising a recording surface, a nozzleless support member for emitting a concentrated magnetic flux and having a surface at which is provided at least one magnetic stylus, said support surface being opposed to said recording surface and said magnetic stylus being directed toward said recording surface, a magnetic field generating means disposed adjacent said support member surface and a magnetofluidic material source, said magnetic field generating means guiding magnetofluidic material to said magnetic stylus and forming a magnetofluidic material protrusion adjacent a tip of said magnetic stylus which is directed toward said recording surface, said protrusion being formed by at least the concentrated magnetic flux emitted from said magnetic stylus, said protrusion being free from contact with said recording surface, and means for generating a force at said stylus for flinging or migrating magnetofluidic material from the protruded part of said magnetofluidic material toward said recording surface in response to a recording signal.

18. An apparatus for nozzleless magnetofluidic recording according to claim 17, wherein said means for generating a force is a means for generating a coulomb force by generating an electric field between a control electrode and said magnetic stylus.

19. An apparatus as in claim 17, wherein said control electrode includes at least one slit provided between said magnetic stylus and said recording surface.

20. An apparatus for nozzleless magnetofluidic recording comprising a recording surface, a nozzleless support member for emitting a concentrated magnetic flux and having a surface at which is provided a plurality of apertureless magnetic styluses divided into a plurality of groups and arranged to oppose said recording surface, said styluses in each of said groups being directed toward said recording surface and being connected in common, a plurality of control electrodes arranged between said recording surface and said support member surface, each of said control electrodes being positioned between the centers of adjacent ones of said magnetic styluses except for those disposed at the extreme ends, a magnet means disposed adjacent said support member surface and a magnetofluidic material source for guiding said magnetofluidic material to said styluses, means for applying through said magnetic styluses a magnetic force for protruding said magnetofluidic material along said magnetic styluses in a direction toward said recording surface, the protrusion of said magnetofluidic material being free from contact with said recording surface, and means for generating a coulomb force at said styluses for flinging or migrating said protruded magnetofluidic material toward said recording surface.

* * * * *